(12) United States Patent
Rey et al.

(10) Patent No.: US 11,736,309 B2
(45) Date of Patent: Aug. 22, 2023

(54) REAL-TIME CONTENT OF INTEREST DETECTION AND NOTIFICATION FOR MEETINGS

(71) Applicant: Microsoft Technology Licensing, LLC, Redmond, WA (US)

(72) Inventors: Romain Gabriel Pa Rey, Vancouver (CA); Alexander Wilson, Seattle, WA (US); Tom Neckermann, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/331,360

(22) Filed: May 26, 2021

(65) Prior Publication Data

US 2022/0385493 A1 Dec. 1, 2022

(51) Int. Cl.
*H04L 12/18* (2006.01)
*G06F 40/30* (2020.01)
*G06F 18/2415* (2023.01)

(52) U.S. Cl.
CPC ...... *H04L 12/1831* (2013.01); *G06F 18/2415* (2023.01); *G06F 40/30* (2020.01); *H04L 12/1818* (2013.01)

(58) Field of Classification Search
CPC . H04L 12/1831; H04L 12/1818; G06F 40/30; G06K 9/6277
See application file for complete search history.

(56) References Cited

U.S. PATENT DOCUMENTS 6,810,394 B2  10/2004  Coutts et al.
8,019,069 B1   9/2011  Cyriac et al.
(Continued)

FOREIGN PATENT DOCUMENTS

JP  2016115019 A  6/2016

OTHER PUBLICATIONS

Dey, et al., "The Conference Assistant: Combining Context-Awareness with Wearable Computing", In Proceedings of the 3rd International Symposium on Wearable Computers, Digest of Papers, Oct. 18, 1999, 9 Pages.

(Continued)

*Primary Examiner* — John A Follansbee
*Assistant Examiner* — Raqiul A Choudhury
(74) *Attorney, Agent, or Firm* — International IP Law Group, PLLC

(57) ABSTRACT

A meeting application server and a method for real-time content of interest detection and notification for a meeting are described herein. The meeting application server includes a processor and a computer-readable storage medium operatively coupled to the processor. The computer-readable storage medium includes computer-executable instructions that cause the processor to receive, via a remote computing system, content of interest data for a meeting. The computer-executable instructions also cause the processor to analyze the content of interest data to determine a theme of interest for the meeting, train a classification model for the theme of interest, and generate real-time meeting data for the meeting. The computer-executable instructions further cause the processor to determine the probability that the real-time meeting data relate to the theme of interest using the classification model and, if the probability exceeds a threshold value, transmit a content of interest alert to the remote computing system.

20 Claims, 7 Drawing Sheets

(56) References Cited

U.S. PATENT DOCUMENTS

| | | | |
|---|---|---|---|
| 8,295,462 B2 | 10/2012 | Miller et al. | |
| 8,731,935 B2 | 5/2014 | Chavez et al. | |
| 9,002,938 B2 | 4/2015 | Bank et al. | |
| 9,690,933 B1* | 6/2017 | Singh | G06N 5/025 |
| 9,977,574 B2* | 5/2018 | Quinn | H04N 7/15 |
| 10,511,643 B2 | 12/2019 | Faulkner et al. | |
| 10,938,589 B2 | 3/2021 | Silva et al. | |
| 2002/0078153 A1* | 6/2002 | Chung | H04L 65/4038 |
| | | | 709/204 |
| 2014/0207457 A1* | 7/2014 | Biatov | G10L 15/063 |
| | | | 704/243 |
| 2016/0065519 A1* | 3/2016 | Waltermann | H04L 51/216 |
| | | | 709/206 |
| 2018/0046957 A1 | 2/2018 | Yaari et al. | |
| 2018/0121539 A1* | 5/2018 | Ciulla | G06F 16/3344 |
| 2018/0288110 A1 | 10/2018 | Kawachi et al. | |
| 2019/0028520 A1* | 1/2019 | Nawrocki | G06F 40/205 |
| 2020/0160278 A1 | 5/2020 | Allen et al. | |
| 2020/0250265 A1* | 8/2020 | Yang | G06N 3/0445 |
| 2020/0382646 A1* | 12/2020 | Rao | H04L 51/18 |
| 2021/0272071 A1* | 9/2021 | Nelson | G06Q 10/1095 |

OTHER PUBLICATIONS

"International Search Report and Written Opinion Issued in PCT Application No. PCT/US22/026865", dated Jul. 22, 2022, 12 Pages.

* cited by examiner

REAL-TIME CONTENT OF INTEREST DETECTION AND NOTIFICATION FOR MEETINGS

BACKGROUND

The present disclosure relates to meeting applications. In particular, the present disclosure relates to methods and systems for real-time content of interest detection and notification for meetings provided by meeting applications.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a meeting application server is described. The meeting application server includes a processor and a computer-readable storage medium operatively coupled to the processor. The computer-readable storage medium includes computer-executable instructions that, when executed by the processor, cause the processor to receive, via a remote computing system that is communicably coupled to the meeting application server through a network, data corresponding to content of interest for a meeting. The computer-executable instructions, when executed by the processor, also cause the processor to analyze the data corresponding to the content of interest to determine a theme of interest for the meeting, train a classification model for the theme of interest and generate real-time meeting data corresponding to the meeting. The computer-executable instructions, when executed by the processor, further cause the processor to determine a probability that at least a portion of the real-time meeting data relates to the theme of interest using the classification model and, in response to determining that the probability exceeds a threshold value, transmit a content of interest alert to the remote computing system through the network.

In another embodiment, a method for real-time content of interest detection and notification for a meeting is described. The method includes executing, via a processor of a computing system, a meeting application to provide a user interface element corresponding to a meeting on a display that is operatively coupled to the processor. The method also includes receiving, via the user interface element, a user input including a direct input of data corresponding to content of interest for the meeting and/or a command for the processor to access stored data corresponding to content of interest for the meeting. The method also includes, in response to the user input, receiving the input data and/or accessing the stored data, analyzing the input data and/or the accessed stored data to determine a theme of interest for the meeting, and training a classification model for the theme of interest. The method further includes receiving, via the meeting application, real-time meeting data corresponding to the meeting, determining a probability that at least a portion of the real-time meeting data relates to the theme of interest using the classification model, and, in response to determining that the probability exceeds a threshold value, generating a content of interest alert via the meeting application.

In another embodiment, a computer-readable storage medium is described. The computer-readable storage medium includes computer-executable instructions that, when executed by a processor of a computing system, cause the processor to receive data corresponding to content of interest for a meeting, analyze the data corresponding to the content of interest to determine a theme of interest for the meeting, and train a classification model for the theme of interest. The computer-executable instructions, when executed by the processor, also cause the processor to generate real-time meeting data corresponding to the meeting, determine a probability that at least the portion of the real-time meeting data relates to the theme of interest using the classification model, and, in response to determining that the probability exceeds a threshold value, generate a content of interest alert.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
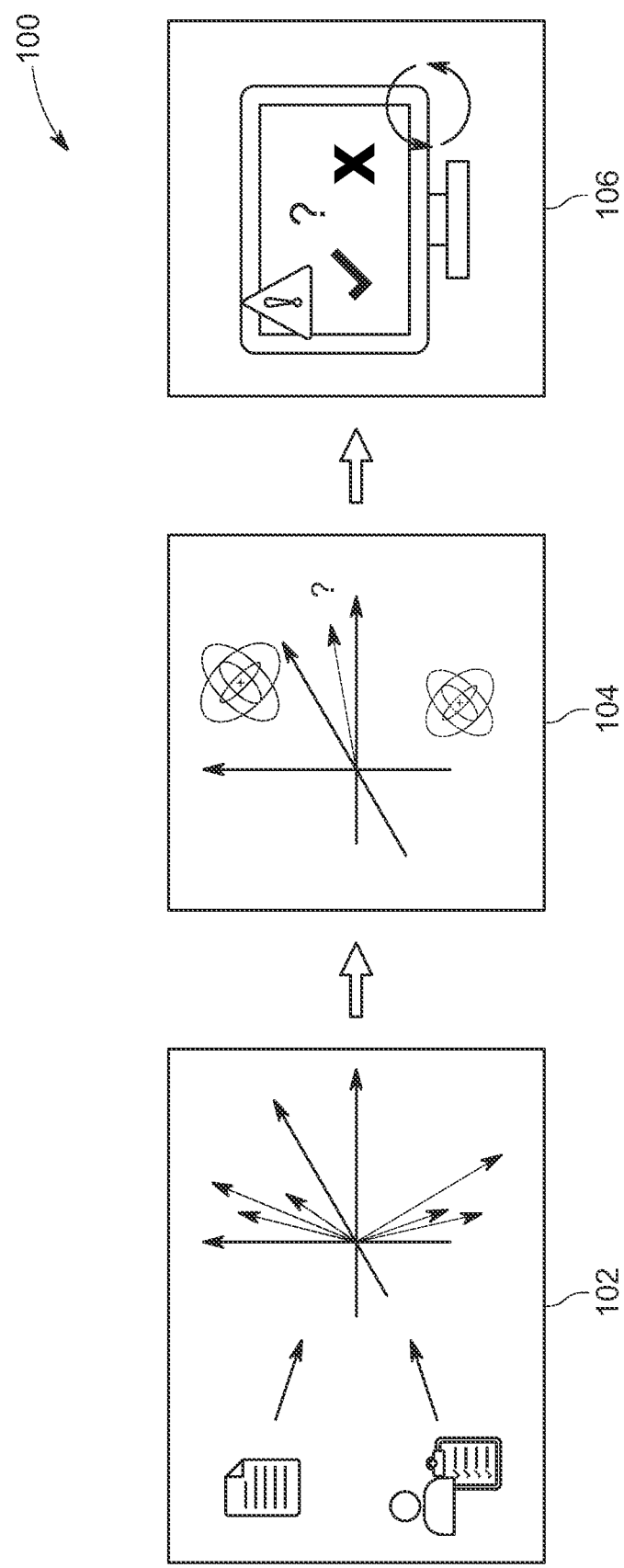
FIG. 1 is a simplified schematic view depicting a process for real-time content of interest detection and notification for meetings according to embodiments described herein.

In today's environment, the use of meeting applications has increased dramatically in both personal and commercial settings to enable virtual meetings (e.g., videoconferences, teleconferences, and the like) between people in remote locations. In general, such meeting applications allows users of remotely-located computing systems to communicate interactively with each other via live, simultaneous, two-way video, audio, and/or written data streams. Moreover, such meeting applications often enable users to exchange files and/or share display screens that present, for example, images, text, video, applications, and the like.

Unfortunately, the use of such meeting applications has proliferated to the point where many users, particularly in commercial settings, are expected to attend a large number of meetings on a daily or weekly basis. This is due, at least in part, to the fact that meeting organizers would typically rather err on the side of inviting all users who may be interested in a particular meeting rather than inviting a smaller number of users and accidentally neglecting to invite one or more users with relevant information for the meeting.

In general, although users are expected to attend such a large number of meetings, only a relatively small percentage of the information presented in a meeting may be of interest to each user. For example, it is not uncommon for a user to find that only about 10% of the information presented during a meeting is of interest to them. Moreover, despite being expected to attend so many meetings, users still face a demanding schedule for accomplishing other tasks outside of such meetings.

As a result of these compounding problems, users tend to multitask during meetings unless they are the one presenting information. While such multitasking is generally expected in today's environment, it still often results in several issues. As an example, users may miss important cues that signal an appropriate time to provide relevant information they may have for the meeting. As another example, users may entirely miss information that is of interest to them. As yet another example, users may ask questions without having a sufficient grasp of the discussion preceding the meeting, resulting in other users having to repeat portions of the discussion to provide context for the question. Furthermore, all of these issues tend to reduce the effectiveness of the meeting and/or unnecessarily lengthen the meeting time.

Accordingly, the present techniques solve this problem by providing for the real-time identification of key moments of interest in a meeting. More specifically, the present techniques apply proximity inference analysis to identify content of interest for a meeting in real-time such that a user can be notified that they should focus on the meeting and/or join the meeting at an appropriate time. According to embodiments described herein, this includes identifying one or more themes of interests by receiving user-specified keywords or phrases and/or extracting keywords or phrases from user-specific data using language understanding algorithms. Once the theme(s) of interest have been identified, a classification model, such as, for example, a Gaussian mixture model, is trained to determine a distribution of vectors related to each theme. Real-time conversational understanding algorithms are then applied during the meeting to identity content associated with the theme(s) of interest using the trained classification model(s). Moreover, when such content is identified, the user is notified via one or more content of interest alerts. In this manner, the present techniques enable the user to effectively multitask during meetings and/or to avoid attending meetings altogether until content that is of interest to the user is detected. Accordingly, the present techniques serve to increase the effectiveness of meetings while simultaneously increasing the productivity of the users who are expected to attend such meetings.

Furthermore, in various embodiments, the present techniques provide a feedback mechanism whereby the user can indicate the effectiveness of particular notifications or alerts. This feedback mechanism is then utilized to increase the accuracy of the process by adjusting the parameters for alerting the user and/or updating the classification model itself, as described further herein.

Notably, the present techniques provide the functionalities described above with very little user involvement. In particular, the user may simply provide keywords or phrases relating to the theme(s) of interest for a meeting and/or permission to access relevant data corresponding to the theme(s) of interest for the meeting, and the techniques described herein may then be used to automatically perform real-time detection and notification of content of interest for the meeting. As a result, the techniques described herein advantageously increase the effectiveness of virtual communications without imposing any significant burden on the users participating in such virtual communications.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," "client," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage media" refers specifically to non-transitory forms of computer-readable storage media and expressly excludes carrier waves and/or propagated signals.

FIG. 1 is a simplified schematic view depicting a process 100 for real-time content of interest detection and notification for meetings according to embodiments described herein. Generally speaking, the process 100 can be broken down into three phases: a first phase for identifying zones of interest for a meeting, a second phase for determining whether the real-time meeting data are proximate to any of the zones of interest, and a third phase for alerting the user in real-time when the meeting data are proximate to one or more zones of interest.

Turning now to the details of the process 100, the first phase of the process 100 is depicted schematically at block 102. In various embodiments, this phase includes two general steps: (1) receiving data corresponding to content that is of interest to a user with respect to an upcoming meeting; and (2) analyzing the content of interest data to determine one or more themes of interest for the meeting. Specifically, in various embodiments, the user provides the content of interest data by specifically inputting information related to one or more topics of interest for the meeting by, for example, typing keywords and/or phrases into a user interface element corresponding to the meeting application. As a specific example, the user interface element may provide an option to input information for any number of themes of interest, and the user may respond by typing (or speaking) "Presentation+Architecture+Swimming Pool" into the box for "Theme 1" and typing "Changing+Insurance+Company" into the box for "Theme 2." Additionally or alternatively, the user may utilize the user interface element to grant the meeting application permission to access particular content of interest data. As an example, the user may grant access to all their recent data, such as, for example, all the documents, emails, and/or other files that the user created and/or accessed within the last few days. As another example, the user may grant access to a specific subset of their recent data, such as, for example, "Every document that I edited within the last two days." As another example, the user may select individual documents, emails, and/or other files that are relevant to the meeting.

Once such content of interest data has been identified, the data are analyzed to extract keywords and/or phrases using any suitable type(s) of language understanding algorithms. The extracted keywords and/or phrases are then projected onto a semantic space (e.g., a word embedding space trained on the language(s) corresponding to the extracted text) to determine vectors of interest. Moreover, the vectors of interest are then clustered to determine the theme(s) of interest. In some embodiments, this involves labelling vectors that are within sufficiently close proximity to a sufficient number of other vectors as forming part of the same theme of interest, while discarding vectors that are not within sufficiently close proximity to a sufficient number of other vectors. In this manner, the textual data extracted from the content of interest data are analyzed and sorted to identify specific portions of the textual data that are likely to relate to content that is of interest to the user.

The second phase of the process 100 is depicted schematically at block 104. In various embodiments, this phase includes three general steps: (1) training a classification model (a Gaussian mixture model) for the themes of interest; (2) generating real-time meeting data when the meeting is in progress; (3) and determining (also in real-time as the meeting is in progress) a probability that the real-time meeting data relate to any of the themes of interest using the classification model corresponding to each theme of interest. In particular, the second phase takes the vectors corresponding to the identified themes of interest as input, and then utilizes such vectors to train a classification model for each theme of interest. In various embodiments, the classification model for each theme is trained to utilize the distribution of vectors for the theme to determine the probability that any given input vector forms part of the distribution and, thus, relates to the theme. In various embodiments, the classification models are Gaussian mixture models, and the corresponding distributions of vectors are Gaussian distributions. However, those skilled in the art will appreciate that other suitable type(s) of classification or probability models may be used to achieve the same technical effect.

According to embodiments described herein, once the classification models have been trained for themes of interest for the meeting, the classification models are used to monitor the meeting for content of interest in real-time as the meeting session is in progress. In particular, the meeting application utilizes the classification models to determine whether the real-time meeting data (which are provided as input vectors to the models) are sufficiently related to any of the themes of interest. In various embodiments, this is accomplished by providing the real-time meeting data as input vectors for the classification models and then determining whether the probability that the input vector forms part of each model exceeds a specified threshold value. As an example, the specified threshold value may be about 50%, about 60% about 70%, about 80%, or about 90%, depending on the details of the specific implementation.

Moreover, as described with respect to the third phase of the process 100, the meeting application may automatically adjust the specified threshold value, such as, for example, in response to user feedback.

In various embodiments, the real-time meeting data include any combination of audio data, textual data, and/or visual data corresponding to the meeting. For example, if the meeting is a videoconference, the real-time meeting data may include, but are not limited to, audio data generated from users who are actively speaking, textual data generated from documents, presentations, and the like that are shared during the meeting (e.g., through a screensharing functionality), textual data generated from a chat feature for exchanging messages between users during the meeting, and/or visual data generated from images shared during the meeting. Furthermore, in various embodiments, the meeting application condenses any (or all) of such real-time meeting data by generating a real-time transcript that represents the information being exchanged during the meeting. Individual portions of the real-time transcript are then used as the input vectors for the classification model.

In some embodiments, the meeting application may also enable the user to select one or more portions of a meeting agenda (e.g., as provided by the meeting organizer) as themes that are of interest to the user. Additionally or alternatively, in some embodiments, the meeting application may enable the meeting organizer to specify themes that are of interest to all users (or any subset thereof) prior to the meeting. As an example, the meeting organizer may specify that a first group of users are interested in a first theme, while a second group of users are interested in a second theme. In addition, the meeting organizer may further specify a degree of interest of each user or group of users. For example, if the meeting organizer knows that a particular user has relevant information to present for a specific theme, the meeting organizer may specify that the particular user is highly interested in the specific theme. In such embodiments, the meeting application may then increase the frequency and/or intensity of the content of interest alert that is transmitted to the particular user when the specific theme is detected.

Furthermore, in some embodiments, the meeting application includes functionality for estimating the information content of the real-time meeting data such that data with low information content can be excluded from the process 100. For example, in many cases, meetings involve some amount of random discussion (or "chit chat") that is not highly relevant to the purpose of the meeting. Accordingly, eliminating the real-time meeting data corresponding to such irrelevant discussion may serve to increase the accuracy and/or efficiency of the overall process 100.

The third phase of the process 100 is depicted schematically at block 106. In various embodiments, this phase includes generating and/or transmitting a content of interest alert or notification when the probability that the real-time meeting data relate to any of the themes of interest exceeds the specified threshold value. In various embodiments, the content of interest alert includes a visual alert that is displayed to the user via an alert window or user interface element that enables the user to click on the meeting to either join the meeting for the first time or navigate back to the meeting application window after having navigated away for multitasking purposes. In addition, in various embodiments, the content of interest alert includes audible and/or tactile (e.g., vibrational) components. Furthermore, in various embodiments, when the user clicks on the alert window, the window may display the title or label of the theme of interest that was detected by the meeting application. In such embodiments, this may enable the user to quickly determine whether the identified content is actually relevant or interesting.

In some embodiments, the frequency and/or intensity of each content of interest alert may be dynamically adjusted based on the probability that the real-time meeting data relate to the theme of interest and/or based on the degree of interest that the user has in the particular theme, as determined based on the content of interest data. As an example, in such embodiments, increasing the frequency of the content of interest alert may include transmitting multiple audible, visual, and/or tactile alerts within a short period of time until the user clicks on the alert window. As another example, in such embodiments, increasing the intensity of the content of interest alert may include increasing the sound level of the audible alert, increasing the degree of screen coverage and/or brightness of the visual alert, increasing the vibrational intensity of the tactile alert, or any combination thereof.

Furthermore, in various embodiments, the third phase also includes receiving feedback from the user of the computing system and using such feedback to improve the process 100. For example, in some embodiments, the content of interest alert provides the user with the ability to indicate whether the alert was a true alert (meaning that the real-time meeting data were sufficiently related to the theme of interest to warrant the alert) or a false alert (meaning that the real-time meeting data were not sufficiently related to the theme of interest to warrant the alert). For example, the alert window may include an option (e.g. in the form of a toggle, checkbox, dropdown list, button, or the like) for the user to select "True Alert" or "False Alert" based on the title or label of the detected theme and/or the real-time meeting data as observed by the user. Moreover, in such embodiments, in response to receiving the user indication that the content of interest alert was a false alert, the process 100 may be improved by, for example, increasing the threshold value for generating the content of interest alert and/or updating the classification model for the theme of interest. In this manner, the user is able to finetune the process 100 to prevent the scenario in which the user receives an overwhelming number of alerts that are not highly relevant to content that is actually of interest to the user.

Figure 2:
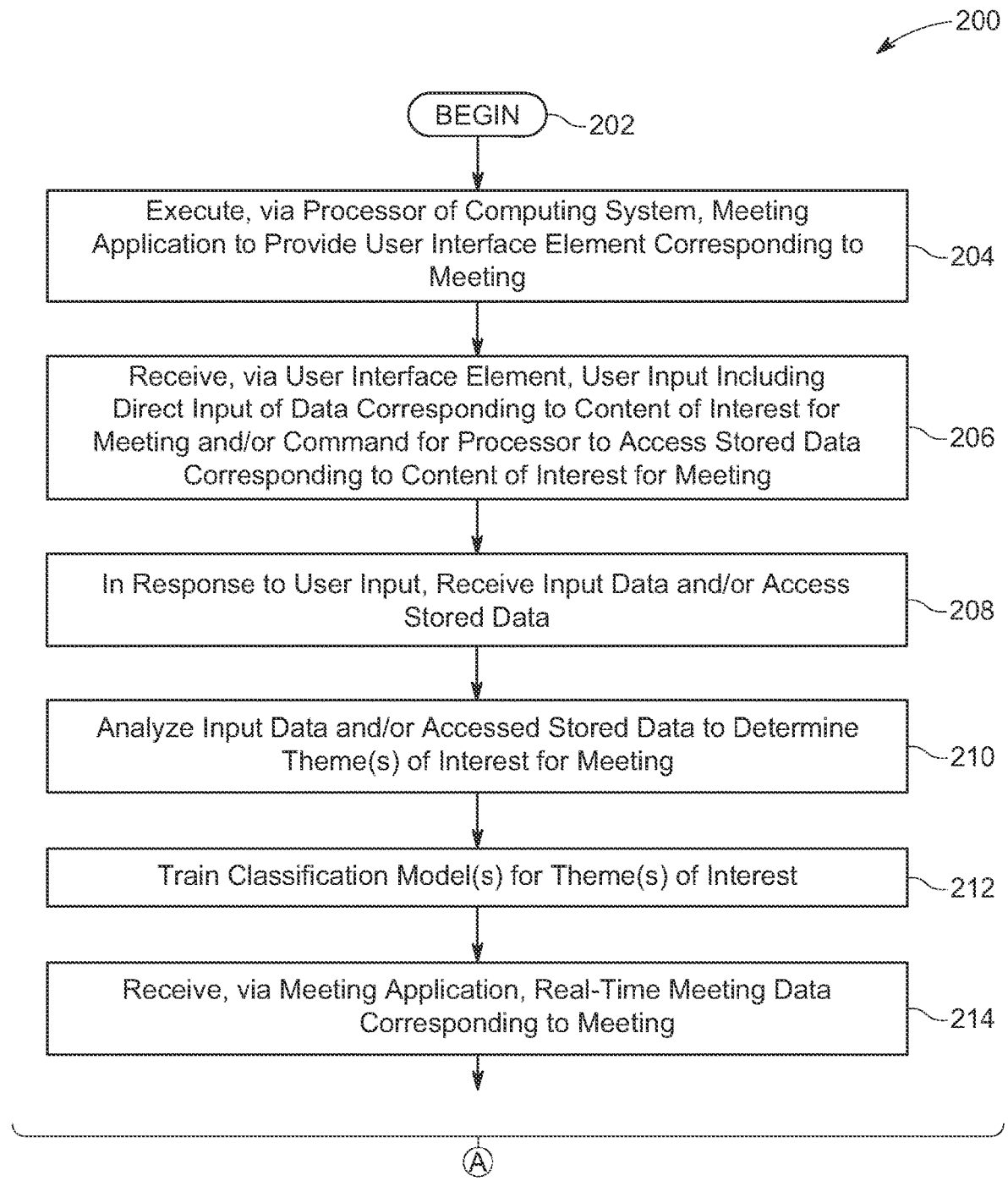
FIG. 2 is a process flow diagram of a method for real-time content of interest detection and notification for a meeting according to embodiments described herein.
Figure 2:
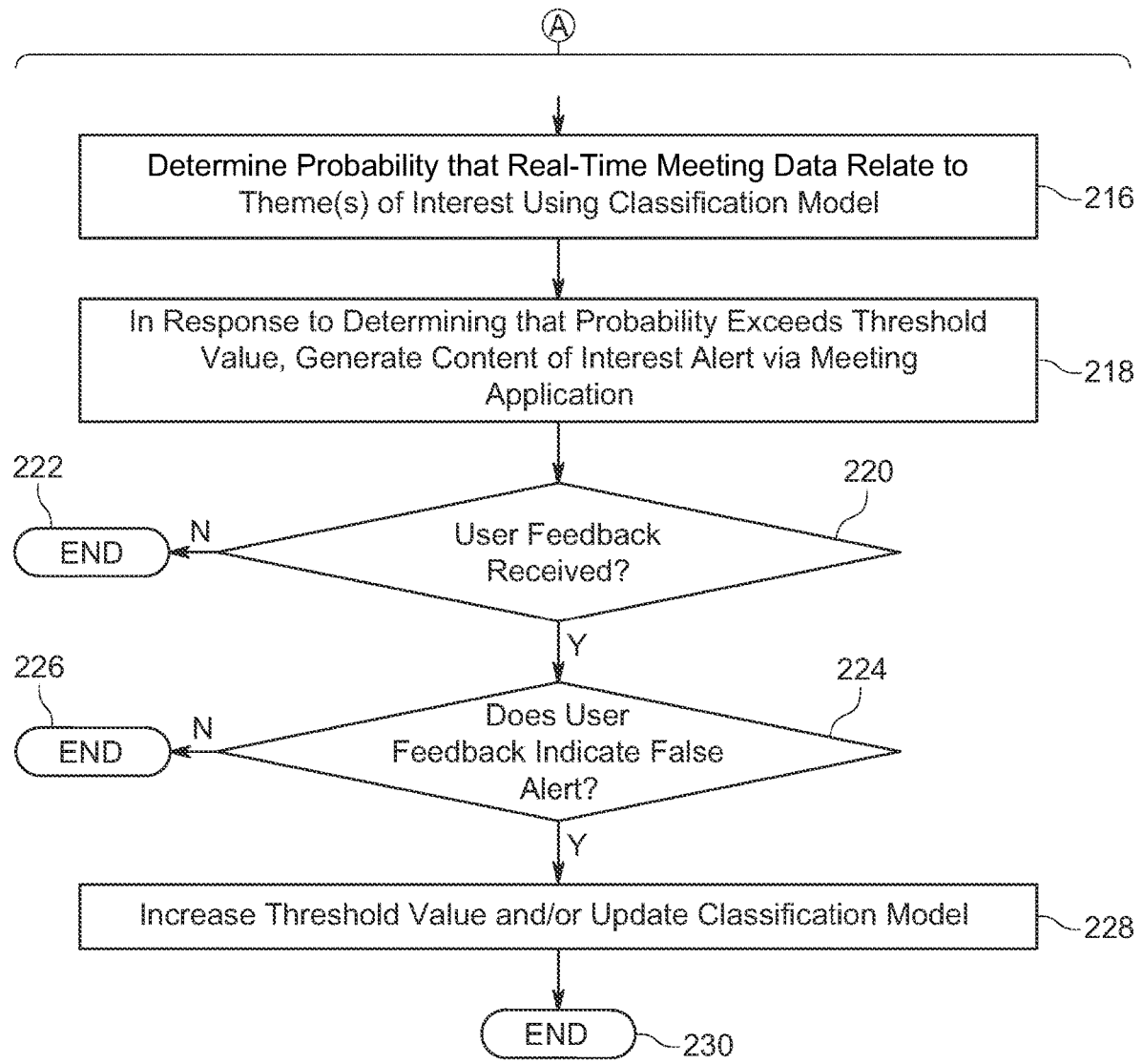

FIG. 2 is a process flow diagram of a method 200 for real-time content of interest detection and notification for a meeting according to embodiments described herein. The method 200 is executed via a computing system including a processor and a display operatively coupled to each other, such as, for example, the computing system 400 described with respect to FIG. 4.

The method 200 begins at block 202 and then proceeds to block 204, at which a meeting application is executed via the processor of the computing system to provide a user interface element corresponding to a meeting on a display that is operatively coupled to the processor. The method 200 then proceeds to block 206, at which a user input including a direct input of data corresponding to content of interest for the meeting and/or a command for the processor to access stored data corresponding to content of interest for the meeting is received via the user interface element. Moreover, in response to the user input, the input data are received and/or the stored data are then accessed at block 208.

At block 210, the input data and/or the accessed stored data are analyzed to determine one or more themes of interest for a meeting, where such theme(s) of interest may include, for example, topics that are determined to be of interest to the user of the computing system based on the data corresponding to the content of interest. In various embodiments, determining the theme(s) of interest includes: (1) extracting text corresponding to the input data and/or the accessed stored data; (2) analyzing the extracted text within a semantic space to determine vectors of interest; and (3) clustering the vectors of interest to determine each theme of interest.

At block 212, a classification model is trained for each theme of interest. In various embodiments, this includes generating a distribution of the vectors of interest corresponding to each theme. Moreover, in some embodiments, the classification model is a Gaussian mixture model, and the distribution of vectors is a Gaussian distribution.

At block 214, real-time meeting data corresponding to the meeting are received via the meeting application. In various embodiments, this includes receiving audio data, visual data, and/or textual data corresponding to the meeting, as well as generating a real-time transcript of the meeting from the audio data, the visual data, and/or the textual data.

At block 216, the probability that at least a portion of the real-time meeting data relates to each theme of interest is determined using the classification model corresponding to each theme. In various embodiments, this includes determining the probability that each portion of the real-time transcript of the meeting relates to each theme of interest in real-time as the meeting progresses.

At block 218, a content of interest alert is generated via the meeting application in response to determining that the probability that a particular portion of the real-time meeting data (e.g., as defined by the real-time transcript of the meeting) relates to a theme of interest exceeds the threshold value. In various embodiments, this includes outputting an audible alert, a visual alert, and/or a tactile alert via one or more output devices of the computing system. Moreover, in various embodiments, the content of interest alert is generated in real-time to enable the user to focus on and/or join the meeting at an appropriate time as the meeting progresses.

The method 200 may then proceed to block 220, at which a determination is made about whether user feedback has been received. In various embodiments, such user feedback is in the form another user input via the user interface element, where the user input includes an indication that the generated content of interest alert was a true alert or a false alert. Moreover, if it is determined that no user feedback has been received at block 220, the method 200 may end at block 222. However, if it is determined that user feedback has been received at block 220, the method 200 may then proceed to block 224, at which a determination is made about whether the user feedback indicates that the generated content of interest alert was a false alert. If it is determined that the user feedback does not indicate that the content of interest alert was a false alert (or, in other words, that the content of interest alert was a true alert), the method 200 may end at block 226. However, if it is determined that the user feedback does indicate that the content of interest alert was a false alert, the method 200 may proceed to block 228, at which the threshold value for generating the content of interest alert is increased and/or the classification model is updated to increase the accuracy of the method 200. The method 200 may then end at block 230. Moreover, those skilled in the art will appreciate that, in some embodiments, the user feedback loop described with respect to blocks 220, 224, and 228 may be omitted from the method 200 entirely, or an alternative type of user feedback loop or option may be provided.

Furthermore, in various embodiments, at least a portion of the method 200 (e.g., blocks 214-230) may be continuously repeated during the duration of the meeting. Therefore, in such embodiments, the ending of the method 200 at block 222, 226, or 230 may involve simply looping back to block 214 to enable the real-time meeting data to be continuously monitored for content of interest.

The block diagram of FIG. 2 is not intended to indicate that the blocks of the method 200 are to be executed in any particular order, or that all of the blocks of the method 200 are to be included in every case. Moreover, any number of additional blocks may be included within the method 200, depending on the details of the specific implementation. For example, in some embodiments, the method 200 also includes encrypting, via the meeting application, the input data and/or the accessed stored data such that the data are not directly stored by, or accessible from, the meeting application and/or the corresponding classification model(s).

Figure 3:
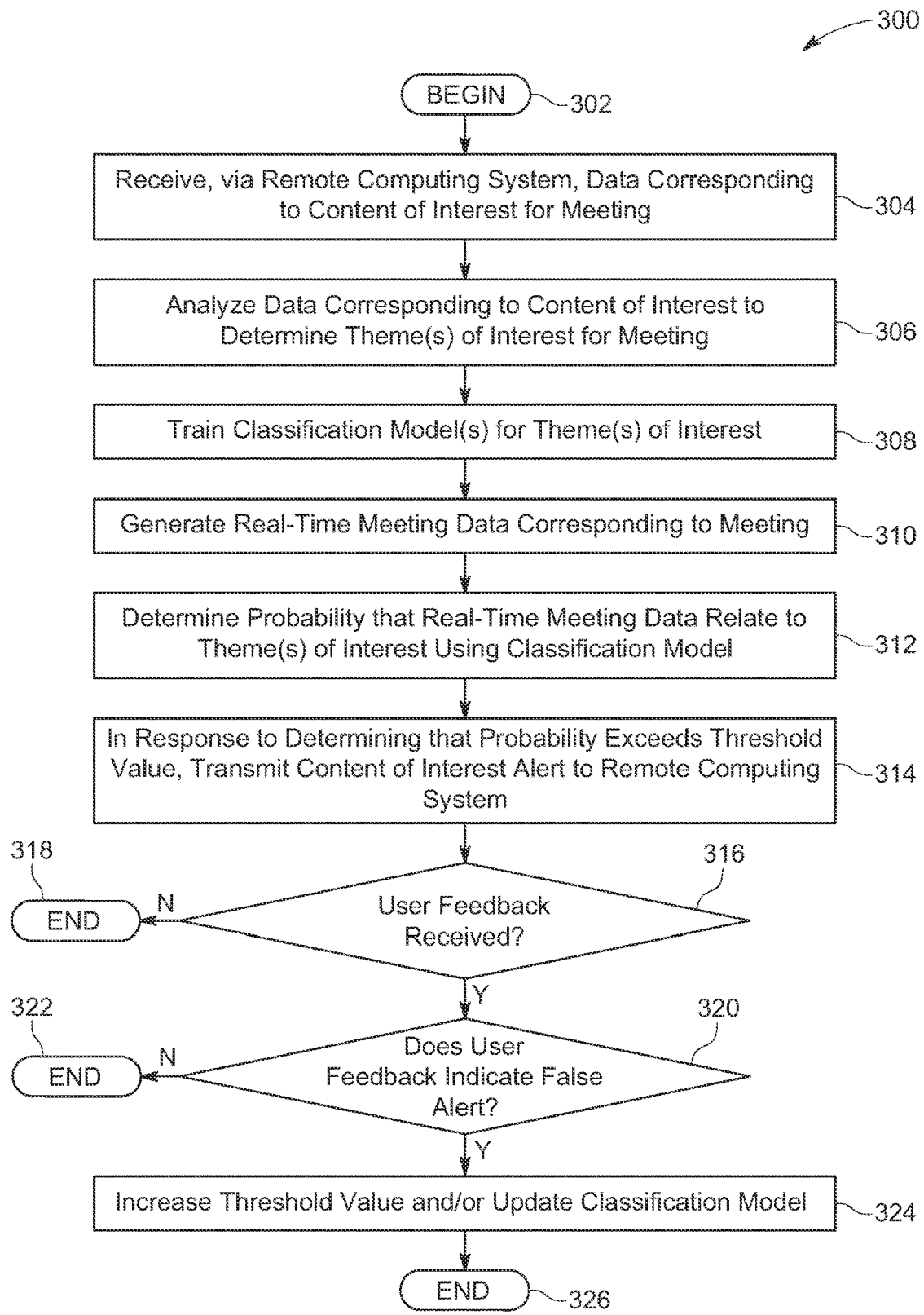
FIG. 3 is a process flow diagram of another method for real-time content of interest detection and notification for a meeting according to embodiments described herein.

FIG. 3 is a process flow diagram of another method 300 for real-time content of interest detection and notification for a meeting according to embodiments described herein. The method 300 is executed via a remote server or system that provides a meeting application for hosting meeting sessions on remote computing systems. For example, in various embodiments, the method 300 is executed via the meeting application server 500 described with respect to FIG. 5. Moreover, in various embodiments, the remote computing systems are communicably coupled to the meeting application server via a network.

The method 300 begins at block 302 and then proceeds to block 304, at which data corresponding to content of interest for a meeting are received from a remote computing system. Such data may include, but are not limited to, data that are directly input by the user and/or stored data relating to the user, as described in more detail with respect to the process 100 of FIG. 1.

At block 306, the data corresponding to the content of interest are analyzed to determine one or more themes of interest for the meeting, where such theme(s) of interest may include, for example, topics that are determined to be of interest to the user of the remote computing system based on the received data corresponding to the content of interest. In various embodiments, determining the theme(s) of interest includes: (1) extracting text corresponding to the content of interest data; (2) analyzing the extracted text within a semantic space to determine vectors of interest; and (3) clustering the vectors of interest to determine each theme of interest.

At block 308, a classification model is trained for the theme(s) of interest. In various embodiments, this includes generating a distribution of the vectors of interest corresponding to each theme. Moreover, in some embodiments, the classification model is a Gaussian mixture model, and the distribution of vectors is a Gaussian distribution.

At block 310, real-time meeting data corresponding to the meeting are generated via the meeting application server during execution of the meeting session, where at least a subset of the real-time meeting data is transmitted to each remote computing system that is running the meeting session hosted by the meeting application server. In various embodiments, the real-time meeting data include audio data, visual data, and/or textual data corresponding to the meeting. Moreover, in various embodiments, generating the real-time meeting data also includes generating a real-time transcript of the meeting from the audio data, the visual data, and/or the textual data.

At block 312, the probability that at least a portion of the real-time meeting data relates to each theme of interest is determined using the classification model corresponding to each theme. In various embodiments, this includes determining the probability that each portion of the real-time transcript of the meeting relates to each theme of interest in real-time as the meeting progresses.

At block 314, a content of interest alert is transmitted to the respective remote computing system via the meeting application server in response to determining that the probability that a particular portion of the real-time meeting data (e.g., as defined by the real-time transcript of the meeting) relates to a theme of interest to the user of the remote computing system exceeds the threshold value. In various embodiments, this includes directing the remote computing system to output an audible alert, a visual alert, and/or a tactile alert via one or more output devices of the remote computing system. Moreover, in various embodiments, the content of interest alert is transmitted in real-time to enable the user to focus on and/or join the meeting at an appropriate time as the meeting progresses.

The method 300 may then proceed to block 316, at which a determination is made about whether user feedback has been received from the remote computing system. In various embodiments, such user feedback includes an indication that the generated content of interest alert was a true alert or a false alert. Moreover, if it is determined that no user feedback has been received at block 316, the method 300 may end at block 318. However, if it is determined that user feedback has been received at block 316, the method 300 may then proceed to block 320, at which a determination is made about whether the user feedback indicates that the generated content of interest alert was a false alert. If it is determined that the user feedback does not indicate that the content of interest alert was a false alert (or, in other words, that the content of interest alert was a true alert), the method 300 may end at block 322. However, if it is determined that the user feedback does indicate that the content of interest alert was a false alert, the method 300 may proceed to block 324, at which the threshold value for generating the content of interest alert is increased and/or the classification model is updated to increase the accuracy of the method 300. The method 300 may then end at block 326. Moreover, those skilled in the art will appreciate that, in some embodiments, the user feedback loop described with respect to blocks 316, 320, and 324 may be omitted from the method 300 entirely, or an alternative type of user feedback loop or option may be provided.

Furthermore, in various embodiments, at least a portion of the method 300 (e.g., blocks 310-326) may be continuously repeated during the duration of the meeting. Therefore, in such embodiments, the ending of the method 300 at block 318, 322, or 326 may involve simply looping back to block 310 to enable the real-time meeting data to be continuously monitored for content of interest.

The block diagram of FIG. 3 is not intended to indicate that the blocks of the method 300 are to be executed in any particular order, or that all of the blocks of the method 300 are to be included in every case. Moreover, any number of additional blocks may be included within the method 300, depending on the details of the specific implementation. For example, in some embodiments, the method 300 also includes encrypting data corresponding to the content of interest such that the data are not directly stored by, or accessible from, the meeting application server and/or the corresponding classification model(s).

Figure 4:
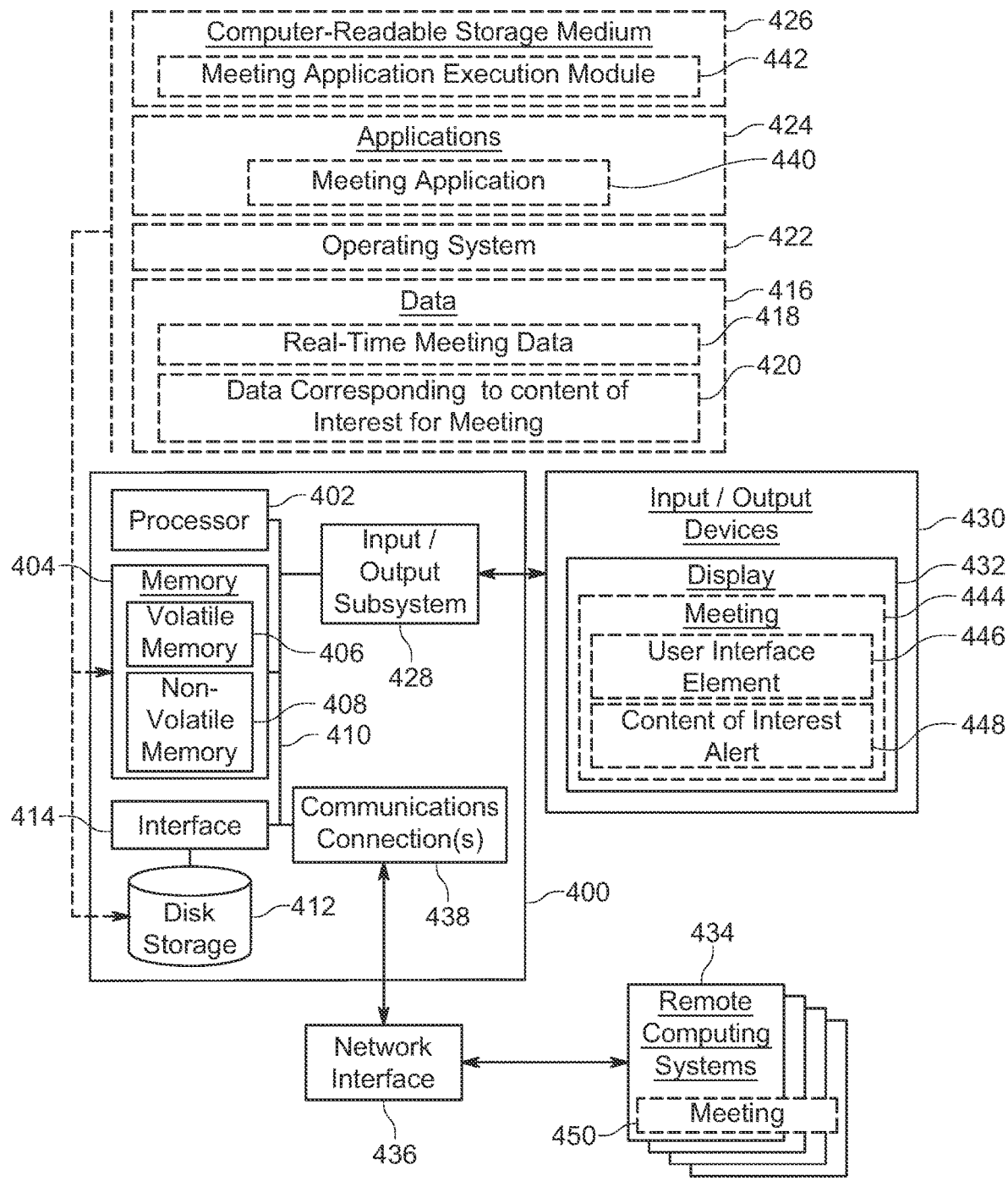
FIG. 4 is a block diagram of an exemplary computing system for implementing the techniques described herein.

FIG. 4 is a block diagram of an exemplary computing system 400 for implementing the techniques described herein. The exemplary computing system 400 includes a processor 402 and a memory 404. The processor 402 may include any suitable type of processing unit or device, such as, for example, a single-core processor, a multi-core processor, a computing cluster, or any number of other configurations. Moreover, the processor 402 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein.

The memory 404 typically (but not always) includes both volatile memory 406 and non-volatile memory 408. The volatile memory 406 retains or stores information so long as the memory is supplied with power. By contrast, the non-volatile memory 408 is capable of storing (or persisting) information even when a power supply is not available. The volatile memory 406 may include, for example, RAM (e.g., synchronous RAM (SRAM), dynamic RAM (DRAM), synchronous dynamic RAM (SDRAM), and the like) and CPU cache memory. The nonvolatile memory 408 may include, for example, read-only memory (ROM) (e.g., programmable ROM (PROM), electrically programmable ROM (EPROM), electrically erasable ROM (EEROM) or the like), flash memory, nonvolatile random-access memory (RAM), solid-state memory devices, memory storage devices, and/or memory cards.

The processor 402 and the memory 404, as well as other components of the computing system 400, are interconnected by way of a system bus 410. The system bus 410 can be implemented using any suitable bus architecture known to those skilled in the art.

According to the embodiment shown in FIG. 4, the computing system 400 also includes a disk storage 412. The disk storage 412 may include any suitable removable/non-removable, volatile/non-volatile storage component or device. For example, the disk storage 412 may include, but is not limited to, a magnetic disk drive, floppy disk drive, tape drive, Jaz drive, Zip drive, LS-210 drive, flash memory card, memory stick, or the like. In addition, the disk storage 412 may include storage media separately from (or in combination with) other storage media including, but not limited to, an optical disk drive, such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 412 to the system bus 410, a removable or non-removable interface is typically used, such as interface 414 shown in FIG. 4.

In various embodiments, the disk storage 412 and/or the memory 404 are used to store data 416 relating to the techniques described herein. Such data may include, for example, real-time meeting data 418 relating to a meeting as well as data 420 corresponding to content of interest for the meeting, as described herein.

Those skilled in the art will appreciate that FIG. 4 describes software that acts as an intermediary between a user of the computing system 400 and the basic computing resources described with respect to the operating environment of the computing system 400. Such software includes an operating system 422. The operating system 422, which may be stored on the disk storage 412, acts to control and allocate the computing resources of the computing system 400. Moreover, system applications 424 take advantage of the management of the computing resources by the operating system 422 through one or more program modules stored within a computer-readable storage medium (or media) 426, as described further herein.

The computing system 400 also includes an input/output (I/O) subsystem 428. The I/O subsystem 428 includes a set of hardware, software, and/or firmware components that enable or facilitate inter-communication between the user of the computing system 400 and the processor 402 of the computing system 400. During operation of the computing system 400, the I/O subsystem 428 enables the user to interact with the computing system 400 through various input/output (I/O) devices 430. Such I/O devices 430 may include any number of input devices or channels, such as, for example, one or more touchscreen/haptic input devices, one or more buttons, one or more pointing devices, one or more accessories, one or more audio input devices, and/or one or more video input devices, such as a camera. As an example, in some embodiments, such input devices or channels include one or more Natural User Interface (NUI) devices, where the term "Natural User Interface (NUI)" refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch-sensitive displays, voice and speech recognition, intention and goal understanding, and motion gesture detection using depth cameras such as stereoscopic camera systems, infrared camera systems, RGB camera systems, and combinations of these. NUI devices can also include motion gesture detection using accelerometers or gyroscopes, facial recognition, three-dimensional (3D) displays, head, eye, and gaze tracking, immersive augmented-reality and virtual-reality systems, all of which provide a more natural interface. Furthermore, in some embodiments the one or more input devices or channels connect to the processor 402 through the system bus 410 via one or more interface ports (not shown) integrated within the I/O subsystem 428. Such interface ports may include, for example, a serial port, a parallel port, a game port, and/or a universal serial bus (USB).

In addition, such I/O devices 430 may include any number of output devices or channels, such as, for example, one or more audio output devices, one or more haptic feedback devices, and/or one or more display devices, such as display 432. Such output devices or channels may use some of the same types of ports as the input devices or channels. Thus, for example, a USB port may be used to both provide input to the computing system 400 and to output information from the computing system 400 to a corresponding output device. Moreover, in some embodiments, the one or more output devices or channels are accessible via one or more adapters (not shown) integrated within the I/O subsystem 428.

In some embodiments, the display 432 is a built-in display screen of the computing system 400. In other embodiments, the display 432 is an external display screen. Moreover, in various embodiments, the display 432 is a touchscreen that serves as both an input and an output device.

In some embodiments, the computing system 400 may be a server hosting various software applications in a networked environment using logical connections to one or more remote computing systems 434. In such embodiments, any number of the components shown in FIG. 4 (such as, for example, the computer-readable storage medium 426 including the meeting application execution module 442, the meeting application 440, and the data 418 and/or 420) may be hosted on the server, while any number of the other components shown in FIG. 4 (such as, for example, the display 432 surfacing the user interface element 446 and/or the content of interest alert 448 for the meeting 444) may be implemented with respect to one or more of the remote computing systems 434, which may be operated by the end users of the meeting application 440. Such remote computing systems 434 may be, for example, client systems configured with web browsers, PC applications, mobile phone applications, and the like. In addition, the remote computing systems 434 may include, for example, one or more personal computers, one or more servers, one or more routers, one or more network PCs, one or more workstations, one or more microprocessor-based appliances, one or more mobile phones, and/or one or more peer devices or other common network nodes. Moreover, this embodiment is described further with respect to the exemplary network environment 400 of FIG. 4.

In various embodiments, the remote computing devices 434 are logically connected to the computing system 400 through a network interface 436 and then connected via a communication connection 438, which may be wireless. The network interface 436 encompasses wireless communication networks, such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The communication connection 438 includes the hardware/software employed to connect the network interface 436 to the bus 410. While communication connection 438 is shown for illustrative clarity as residing inside the computing system 400, it can also be external to the computing system 400. The hardware/software for connection to the network interface 436 may include, for example, internal and external technologies, such as mobile phone switches, modems including regular telephone grade modems, cable modems and DSL modems, ISDN adapters, and/or Ethernet cards.

As described above, system applications 424, such as the meeting application 440 described herein, take advantage of the management of the computing resources by the operating system 422 through one or more program modules stored within the computer-readable storage medium (or media) 426. In some embodiments, the computer-readable storage medium 426 is integral to the computing system 400, in which case it may form part of the memory 404 and/or the disk storage 412. In other embodiments, the computer-readable storage medium 426 is an external device that is connected to the computing system 400 when in use.

In various embodiments, the one or more program modules stored within the computer-readable storage medium 426 include program instructions or code that may be executed by the processor 402 to perform various operations, including the techniques described herein. In various embodiments, such program modules include, but are not limited to, a meeting application execution module 442 that causes the processor 402 to perform operations that result in the execution of the meeting application 440 to implement techniques for real-time content of interest detection and notification for meetings, as described herein with respect to the process 100 of FIG. 1, the method 200 of FIG. 2, and the method 300 of FIG. 3.

Furthermore, as shown in FIG. 1, execution of the meeting application 440 via the meeting application execution module 442 results in the surfacing of information relating to a meeting 444 on the display 432 of the computing system 400. Such information includes, but is not limited to, a user interface element 446 (e.g., a graphical user interface (GUI) element) corresponding to a meeting, where such user interface element 446 provides the user with a means of inputting data corresponding to content of interest for the meeting and/or commanding the processor 402 to access stored data 420 corresponding to content of interest for the meeting. In various embodiments, such stored data 420 may include, for example, documents, presentations, videos, websites, emails, and the like that are specified by the user and/or were recently accessed by the user via the computing system 400. Furthermore, in various embodiments, the data identified via the user interface element 446 are utilized, as described herein, to monitor the meeting 444 and to provide one or more content of interest alerts 448 to the user. According to embodiments described herein, such content of interest alerts are provided in real-time as the meeting 450 progresses with respect to the remote users operating the remote computing systems 434.

It is to be understood that the block diagram of FIG. 4 is not intended to indicate that the computing system 400 is to include all of the components shown in FIG. 4. Rather, the computing system 400 can include fewer or additional components not illustrated in FIG. 4 (e.g., additional applications, additional modules, additional memory devices, additional network interfaces, etc.). Furthermore, any of the functionalities of the one or more program modules/submodules may be partially, or entirely, implemented in hardware and/or in the processor 402. For example, the functionality may be implemented with an application specific integrated circuit, in logic implemented in the processor 402, or in any other device.

Figure 5:
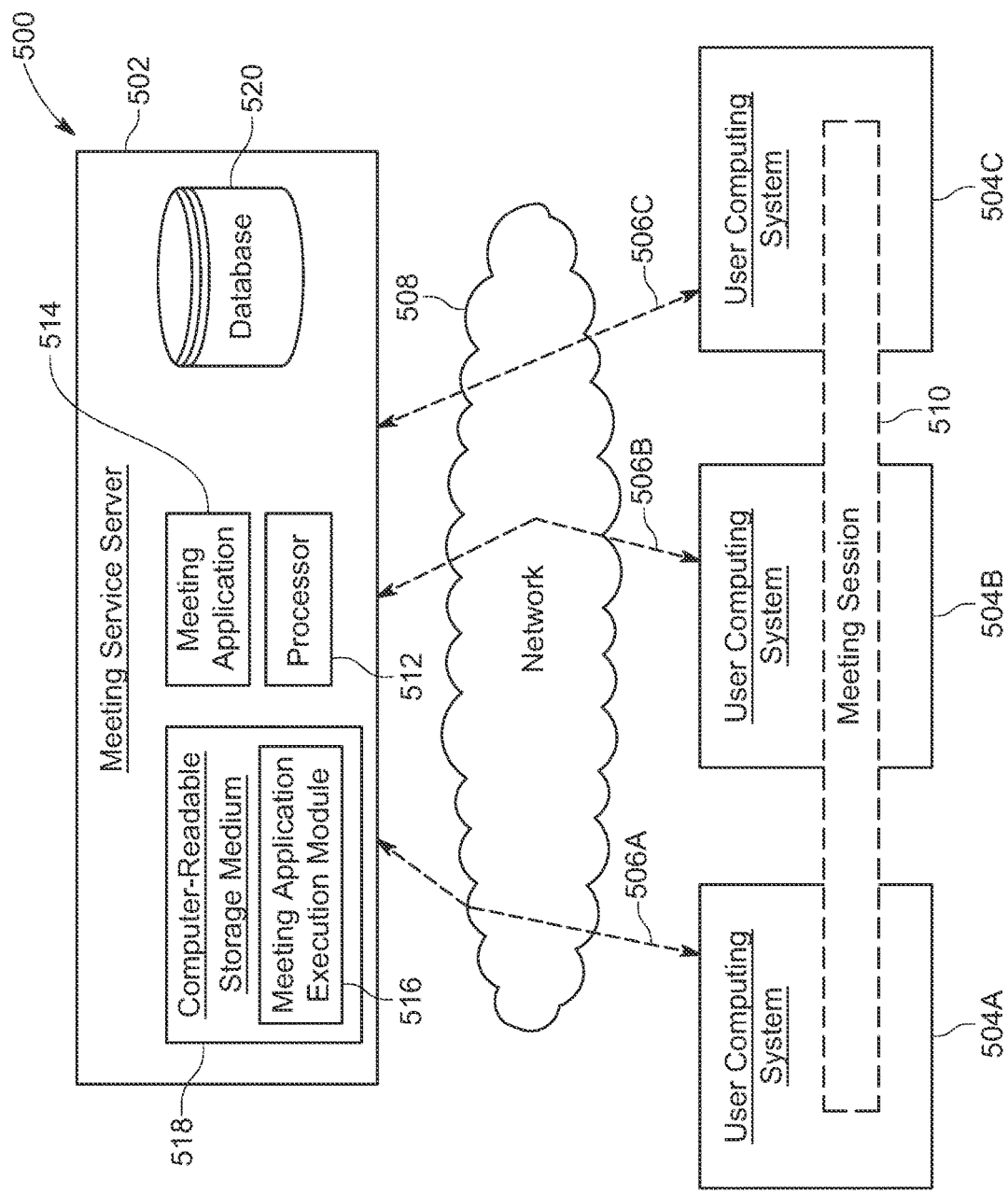
FIG. 5 is a block diagram of an exemplary network environment for implementing the techniques described herein.

FIG. 5 is a block diagram of an exemplary network environment 500 for implementing the techniques described herein. As shown in FIG. 5, the network environment 500 includes a meeting application server 502 that provides real-time meeting data streams to one or more user computing systems 504A, 504B, and 504C, as indicated by arrows 506A, 506B, and 506C, respectively, as part of an online (or web-based) meeting service. Specifically, such real-time meeting data streams are sent to the user computing devices 504A, 504B, and 504C via a network 508, which provides a communications link for facilitating the transfer of electronic content between the meeting application server 502 and the user computing systems 504A, 504B, and 504C. The network 508 may include, but is not limited to, a cellular network, a point-to-point dial up connection, a satellite network, the Internet, a local area network (LAN), a wide area network (WAN), and/or a Wi-Fi network. Such networks are widely used to connect various types of network elements, such as routers, servers, and gateways. Moreover, those skilled in the art will appreciate that the present techniques may also be practiced in a multi-network environment having various connected public and/or private networks. Furthermore, those skilled in the art will appreciate that communication networks can take several different forms and use several different communication protocols. For example, in some embodiments, the present techniques may be practiced in a distributed computing environment in which tasks are performed by remote processing devices that are linked through a communications network. In a distributed computing environment, program modules can be located in both local and remote computer-readable storage media.

In various embodiments, the user computing systems 504A, 504B, and 504C each include a processor, memory, disk storage, and input/output subsystem that operatively couple one or more input/output devices to the processor, as described with respect to the computing system 400 of FIG. 4. Moreover, each of the user computing systems 504A, 504B, and 504C can include any suitable type of computing device, including, but not limited to, a desktop computer, laptop computer, tablet, mobile phone, gaming system, television, or the like. Generally speaking, each user computing system 504A, 504B, and 504C may include any type of computing device that provides its user with the ability to load and execute software programs, as well as the ability to access the network 508 to communicate with the meeting application server 502.

Figure 6:
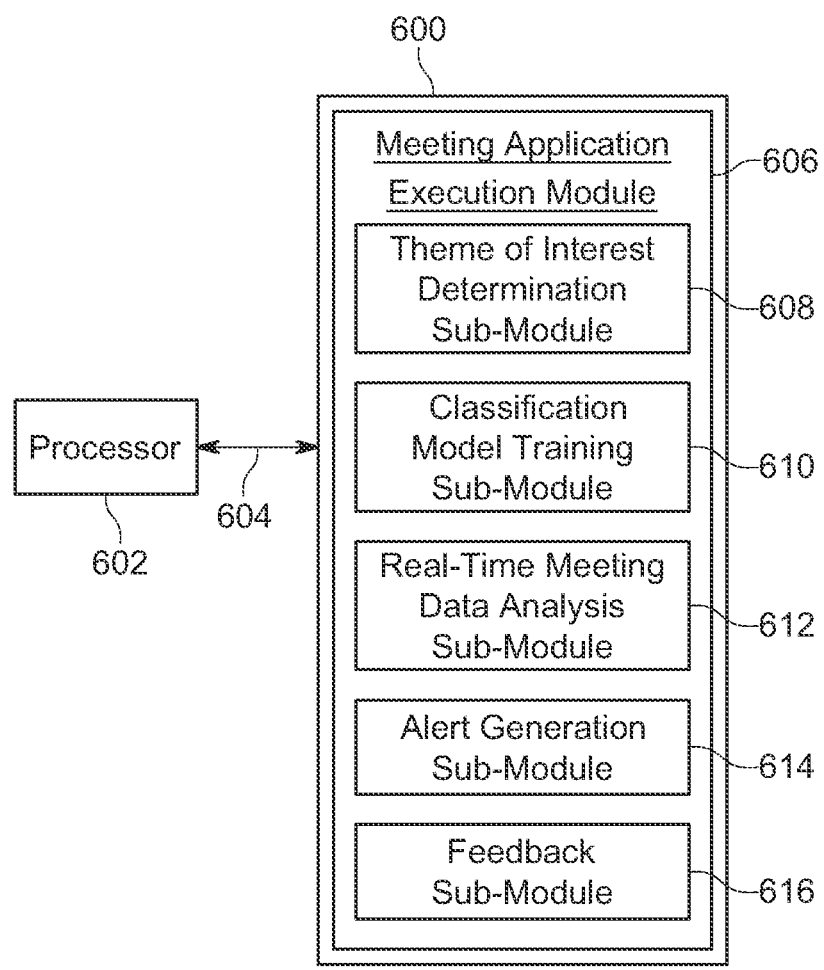
FIG. 6 is a block diagram of an exemplary computer-readable storage medium for implementing the techniques described herein.

In various embodiments, the meeting application server 502 hosts an online meeting session 510 by executing, via a processor 512 of the meeting application server 502, an online meeting application 514 according to a meeting application execution module 516 stored within a computer-readable storage medium 518, as described further with respect to FIG. 6. In addition, the meeting application server 502 may include a database 520 that functions as a repository for the data used by the components of the meeting application server 502 to provide the meeting session 510 on the user computing systems 504A, 504B, and 504C. In various embodiments, such data include the real-time meeting data, as described herein. In addition, in various embodiments, such data include data corresponding to the content that is of interest to a particular user for the meeting session 510, where such content of interest data are received from the user computing system 504A, 504B, or 504C corresponding to the particular user via the network 508, as indicated by arrow 506A, 506B, or 506C, respectively. Moreover, in various embodiments, the meeting application server 502 is configured to provide, during execution of the online meeting application 514, a user interface element that enables the user to input such content of interest data. As described herein, the meeting application server 502 may then utilize such data to detect content of interest for the meeting session 510 and to provide real-time alerts to the user of the respective computing system 504A, 504B, or 504C when such content is detected.

It is to be understood that the block diagram of FIG. 5 is not intended to indicate that the network environment 500 is to include all of the components shown in FIG. 5. Rather, the network environment 500 can include fewer or additional components not illustrated in FIG. 5. For example, in practice, the meeting application server 502 and the user computing systems 504A, 504B, and 504C will include a number of additional components not depicted in the simplified block diagram of FIG. 5, as described with respect to the computing system 400 of FIG. 4, for example.

FIG. 6 is a block diagram of an exemplary computer-readable storage medium 600 for implementing the techniques described herein. In various embodiments, the computer-readable storage medium 600 is accessed by a processor 602 over a computer interconnect 604. For example, in some embodiments, the computer-readable storage medium 600 is the same as, or similar to, the computer-readable storage medium described with respect to the computing system 400 of FIG. 4 and/or the network environment 500 of FIG. 5.

In various embodiments, the computer-readable storage medium 600 includes code (i.e., computer-executable instructions) to direct the processor 602 to perform the operations of the present techniques. Such code may be stored within the computer-readable storage medium 600 in the form of program modules, where each module includes a set of computer-executable instructions that, when executed by the processor 602, cause the processor 602 to perform a corresponding set of operations. In particular, in various embodiments, the computer-readable storage medium 600 includes a meeting application execution module 606 that directs the processor 602 to perform the techniques described herein (or any suitable variation thereof). Such techniques include, but are not limited to, the process 100 described with respect to FIG. 1, the method 200 described with respect to FIG. 2, and the method 300 described with respect to FIG. 3.

Furthermore, in various embodiments, the meeting application execution module 606 accomplishes this via a number of sub-modules. Such sub-modules may include, but are not limited to, a theme of interest determination sub-module 608 for determining one or more themes of interest for a meeting based on data received from the user of the computing system and/or data stored on the computing system, a classification model training sub-module 610 for training a classification model for each theme of interest for the meeting, a real-time meeting data analysis sub-module 612 for determining the probability that portions of the real-time meeting data relate to any of the themes of interest for the meeting using the corresponding classification models, an alert generation module 614 for generating a content of interest alert when the probability that a portion of the real-time meeting data relates to any of the themes of interest exceeds a threshold value, and a feedback sub-module 616 for receiving user feedback regarding the content of interest alert and updating the threshold value and/or any of the classification models accordingly.

Moreover, those skilled in the art will appreciate that any suitable number of the modules/sub-modules shown in FIG. 6 may be included within the computer-readable storage medium 600. Furthermore, any number of additional modules/sub-modules not shown in FIG. 6 may be included within the computer-readable storage medium 600, depending on the details of the specific implementation.

Furthermore, it should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like)) that is executed on one or more processors of computing systems. Additionally, in various embodiments, all or some of the various methods and processes may also be embodied in executable hardware modules including, but not limited to, system on chips (Sot's), codecs, specially designed processors and/or logic circuits, and the like, on a computing system.

As suggested above, each method or process described herein is typically embodied within computer-executable instruction (or code) modules including individual routines, functions, looping structures, selectors and switches (such as if-then and if-then-else statements), assignments, arithmetic computations, and the like, that, in execution, configure a computing system to operate in accordance with the particular method or process However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

Examples

Example 1 is a meeting application server including a processor and a computer-readable storage medium operatively coupled to the processor. The computer-readable storage medium includes computer-executable instructions that, when executed by the processor, cause the processor to receive, via a remote computing system that is communicably coupled to the meeting application server through a network, data corresponding to content of interest for a meeting. The computer-executable instructions, when executed by the processor, also cause the processor to analyze the data corresponding to the content of interest to determine a theme of interest for the meeting, train a classification model for the theme of interest and generate real-time meeting data corresponding to the meeting. The computer-executable instructions, when executed by the processor, further cause the processor to determine a probability that at least a portion of the real-time meeting data relates to the theme of interest using the classification model and, in response to determining that the probability exceeds a threshold value, transmit a content of interest alert to the remote computing system through the network.

Example 2 includes the meeting application server of example 1, including or excluding optional features. In this example, the computer-executable instructions, when executed by the processor, cause the processor to analyze the data corresponding to the content of interest to determine the theme of interest for the meeting by extracting text corresponding to the at least one of the input data or the accessed stored data, analyzing the extracted text within a semantic space to determine vectors of interest, and clustering the vectors of interest to determine the theme of interest.

Example 3 includes the meeting application server of example 2, including or excluding optional features. In this example, the computer-executable instructions, when executed by the processor, cause the processor to train the classification model for the theme of interest by generating a distribution of the vectors of interest corresponding to the theme.

Example 4 includes the meeting application server of example 3, including or excluding optional features. In this example, the classification model includes a Gaussian mixture model, and the distribution includes a Gaussian distribution.

Example 5 includes the meeting application server of any one of examples 1 to 4, including or excluding optional features. In this example, the computer-executable instructions, when executed by the processor, cause the processor to generate the real-time meeting data by generating audio data, visual data, or textual data, or a combination thereof, corresponding to the meeting, as well as generating a real-time transcript of the meeting from the audio data, the visual data, the textual data, or the combination thereof.

Example 6 includes the meeting application server of example 5, including or excluding optional features. In this example, the computer-executable instructions, when executed by the processor, cause the processor to determine the probability that at least the portion of the real-time meeting data relates to the theme of interest by determining a probability that each portion of the real-time transcript relates to the theme of interest in real-time as the meeting progresses.

Example 7 includes the meeting application server of example 6, including or excluding optional features. In this example, the computer-executable instructions, when executed by the processor, cause the processor to generate the content of interest alert in real-time as the meeting progresses in response to determining that the probability that a particular portion of the real-time transcript relates to the theme of interest exceeds the threshold value.

Example 8 includes the meeting application server of any one of examples 1 to 7, including or excluding optional features. In this example, the computer-executable instructions, when executed by the processor, cause the processor to transmit the content of interest alert by directing the remote computing system to output an audible alert, a visual alert, a tactile alert, or a combination thereof, via at least one output device of the remote computing system.

Example 9 includes the meeting application server of any one of examples 1 to 8, including or excluding optional features. In this example, the computer-executable instructions, when executed by the processor, cause the processor to receive, via the remote computing system that is communicably coupled to the meeting application server through the network, an indication that the content of interest alert was a true alert or a false alert and, in response to receiving an indication that the content of interest alert was a false alert, perform at least one of increasing the threshold value for generating the content of interest alert or updating the classification model.

Example 10 includes the meeting application server of any one of examples 1 to 9, including or excluding optional features. In this example, the computer-executable instructions, when executed by the processor, cause the processor to encrypt the data corresponding to the content of interest for the meeting.

Example 11 is a method for real-time content of interest detection and notification for a meeting. The method includes executing, via a processor of a computing system, a meeting application to provide a user interface element corresponding to a meeting on a display that is operatively coupled to the processor. The method also includes receiving, via the user interface element, a user input including a direct input of data corresponding to content of interest for the meeting and/or a command for the processor to access stored data corresponding to content of interest for the meeting. The method also includes, in response to the user input, receiving the input data and/or accessing the stored data, analyzing the input data and/or the accessed stored data to determine a theme of interest for the meeting, and training a classification model for the theme of interest. The method further includes receiving, via the meeting application, real-time meeting data corresponding to the meeting, determining a probability that at least a portion of the real-time meeting data relates to the theme of interest using the classification model, and, in response to determining that the probability exceeds a threshold value, generating a content of interest alert via the meeting application.

Example 12 includes the method of example 11, including or excluding optional features. In this example, the method includes analyzing the at least one of the input data or the accessed stored data to determine the theme of interest for the meeting by: extracting text corresponding to the at least one of the input data or the accessed stored data; analyzing the extracted text within a semantic space to determine vectors of interest; and clustering the vectors of interest to determine the theme of interest.

Example 13 includes the method of example 12, including or excluding optional features. In this example, training the classification model for the theme of interest includes generating a distribution of the vectors of interest corresponding to the theme.

Example 14 includes the method of any one of examples 11 to 13, including or excluding optional features. In this example, receiving the real-time meeting data includes receiving audio data, visual data, or textual data, or a combination thereof, corresponding to the meeting; and generating a real-time transcript of the meeting from the audio data, the visual data, the textual data, or the combination thereof.

Example 15 includes the method of any one of example 14, including or excluding optional features. In this example, determining the probability that at least the portion of the real-time meeting data relates to the theme of interest includes determining a probability that each portion of the real-time transcript relates to the theme of interest in real-time as the meeting progresses, and the method includes generating the content of interest alert in real-time as the meeting progresses in response to determining that the probability that a particular portion of the real-time transcript relates to the theme of interest exceeds the threshold value.

Example 16 includes the method of any one of examples 11 to 15, including or excluding optional features. In this example, the method further includes receiving, via the user interface element, another user input including an indication that the generated content of interest alert was a true alert or a false alert and, in response to receiving an indication that the content of interest alert was a false alert, performing at least one of increasing the threshold value for generating the content of interest alert or updating the classification model.

Example 17 includes the method of any one of examples 11 to 16, including or excluding optional features. In this example, the method further includes encrypting, via the meeting application, the at least one of the input data or the accessed stored data.

Example 18 is a computer-readable storage medium including computer-executable instructions that, when executed by a processor of a computing system, cause the processor to receive data corresponding to content of interest for a meeting, analyze the data corresponding to the content of interest to determine a theme of interest for the meeting, and train a classification model for the theme of interest. The computer-executable instructions, when executed by the processor, also cause the processor to generate real-time meeting data corresponding to the meeting, determine a probability that at least the portion of the real-time meeting data relates to the theme of interest using the classification model, and, in response to determining that the probability exceeds a threshold value, generate a content of interest alert.

Example 19 includes the computer-readable storage medium of example 18, including or excluding optional features. In this example, the classification model includes a Gaussian mixture model, and the computer-executable instructions, when executed by the processor, cause the processor to train the classification model for the theme of interest by generating a Gaussian distribution of the vectors of interest corresponding to the theme.

Example 20 includes the computer-readable storage medium of example 18 or 19, including or excluding optional features. In this example, the computer-executable instructions, when executed by the processor, cause the processor to receive an indication that the content of interest alert was a true alert or a false alert; and, in response to receiving an indication that the content of interest alert was a false alert, perform at least one of: increasing the threshold value for generating the content of interest alert; or updating the classification model.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:
1. A meeting application server, comprising:
a processor; and
a computer-readable storage medium operatively coupled to the processor, the computer-readable storage medium comprising computer-executable instructions that, when executed by the processor, cause the processor to:
receive, via a remote computing system that is communicably coupled to the meeting application server through a network, data corresponding to content of interest for a meeting;
analyze the data corresponding to the content of interest to determine a theme of interest for the meeting;
train a classification model for the theme of interest;
generate real-time meeting data corresponding to the meeting;
determine a probability that at least a portion of the real-time meeting data relates to the theme of interest using the classification model;
in response to determining that the probability exceeds a threshold value, transmit a real-time content of interest alert to the remote computing system through the network, wherein the real-time content of interest alert comprises a visual component comprising a user interface element for surfacing a meeting application window on a display of the remote computing system, and wherein the real-time content of interest alert further comprises at least one of an audible component or a tactile component, wherein at least one of a frequency or an intensity of the at least one of the audible component or the tactile component is dynamically adjusted based on a degree to which the probability exceeds the threshold value; and
in response to user input comprising a selection of the user interface element, cause surfacing of the meeting application window comprising the meeting along with a label of the theme of interest.

2. The meeting application server of claim 1, wherein the computer-executable instructions, when executed by the processor, cause the processor to analyze the data corresponding to the content of interest to determine the theme of interest for the meeting by:

extracting text corresponding to the data corresponding to the content of interest for the meeting;

analyzing the extracted text within a semantic space to determine vectors of interest; and clustering the vectors of interest to determine the theme of interest.

3. The meeting application server of claim 2, wherein the computer-executable instructions, when executed by the processor, cause the processor to train the classification model for the theme of interest by generating a distribution of the vectors of interest corresponding to the theme.

4. The meeting application server of claim 3, wherein the classification model comprises a Gaussian mixture model, and wherein the distribution comprises a Gaussian distribution.

5. The meeting application server of claim 1, wherein the computer-executable instructions, when executed by the processor, cause the processor to generate the real-time meeting data by:

generating audio data, visual data, or textual data, or a combination thereof, corresponding to the meeting; and generating a real-time transcript of the meeting from the audio data, the visual data, the textual data, or the combination thereof.

6. The meeting application server of claim 5, wherein the computer-executable instructions, when executed by the processor, cause the processor to determine the probability that at least the portion of the real-time meeting data relates to the theme of interest by determining a probability that each portion of the real-time transcript relates to the theme of interest in real-time as the meeting progresses.

7. The meeting application server of claim 6, wherein the computer-executable instructions, when executed by the processor, cause the processor to generate the real-time content of interest alert in real-time as the meeting progresses in response to determining that the probability that a particular portion of the real-time transcript relates to the theme of interest exceeds the threshold value.

8. The meeting application server of claim 1, wherein the computer-executable instructions, when executed by the processor, cause the processor to transmit the real-time content of interest alert by directing the remote computing system to output the at least one of the audible component or the tactile component of the real-time content of interest alert via at least one output device of the remote computing system.

9. The meeting application server of claim 1, wherein the computer-executable instructions, when executed by the processor, cause the processor to:

receive, via the remote computing system that is communicably coupled to the meeting application server through the network, an indication that the real-time content of interest alert was a true alert or a false alert; and in response to receiving an indication that the real-time content of interest alert was a false alert, perform at least one of:

increasing the threshold value for generating the real-time content of interest alert; or updating the classification model.

10. The meeting application server of claim 1, wherein the computer-executable instructions, when executed by the processor, cause the processor to encrypt the data corresponding to the content of interest for the meeting.

11. A method for real-time content of interest detection and notification for a meeting, the method comprising:

executing, via a processor of a computing system, a meeting application to provide a user interface element corresponding to a meeting on a display that is operatively coupled to the processor;

receiving, via the user interface element, a user input comprising at least one of a direct input of data corresponding to content of interest for the meeting or a command for the processor to access stored data corresponding to content of interest for the meeting;

in response to the user input, performing at least one of receiving the input data or accessing the stored data;

analyzing the at least one of the input data or the accessed stored data to determine a theme of interest for the meeting;

training a classification model for the theme of interest;

receiving, via the meeting application, real-time meeting data corresponding to the meeting;

determining a probability that at least a portion of the real-time meeting data relates to the theme of interest using the classification model;

in response to determining that the probability exceeds a threshold value, generating a real-time content of interest alert via the meeting application, wherein the real-time content of interest alert comprises a visual component comprising a user interface element for surfacing a meeting application window on a display of the computing system, and wherein the real-time content of interest alert further comprises at least one of an audible component or a tactile component, wherein at least one of a frequency or an intensity of the at least one of the audible component or the tactile component is dynamically adjusted based on a degree to which the probability exceeds the threshold value; and in response to second user input comprising a selection of the user interface element, surfacing the meeting application window comprising the meeting along with a label of the theme of interest.

12. The method of claim 11, comprising analyzing the at least one of the input data or the accessed stored data to determine the theme of interest for the meeting by:

extracting text corresponding to the at least one of the input data or the accessed stored data;

analyzing the extracted text within a semantic space to determine vectors of interest; and clustering the vectors of interest to determine the theme of interest.

13. The method of claim 12, wherein training the classification model for the theme of interest comprises generating a distribution of the vectors of interest corresponding to the theme.

14. The method of claim 11, wherein receiving the real-time meeting data comprises:

receiving audio data, visual data, or textual data, or a combination thereof, corresponding to the meeting; and generating a real-time transcript of the meeting from the audio data, the visual data, the textual data, or the combination thereof.

15. The method of claim 14, wherein determining the probability that at least the portion of the real-time meeting data relates to the theme of interest comprises determining a probability that each portion of the real-time transcript relates to the theme of interest in real-time as the meeting progresses, and wherein the method comprises generating the real-time content of interest alert in real-time as the meeting progresses in response to determining that the probability that a particular portion of the real-time transcript relates to the theme of interest exceeds the threshold value.

16. The method of claim 11, further comprising:
receiving, via the user interface element, another user input comprising an indication that the generated real-time content of interest alert was a true alert or a false alert; and
in response to receiving an indication that the real-time content of interest alert was a false alert, performing at least one of:
increasing the threshold value for generating the real-time content of interest alert; or
updating the classification model.

17. The method of claim 11, further comprising encrypting, via the meeting application, the at least one of the input data or the accessed stored data.

18. A computer-readable storage medium comprising computer-executable instructions that, when executed by a processor, cause the processor to:
receive data corresponding to content of interest for a meeting;
analyze the data corresponding to the content of interest to determine a theme of interest for the meeting;
train a classification model for the theme of interest;
generate real-time meeting data corresponding to the meeting;
determine a probability that at least the portion of the real-time meeting data relates to the theme of interest using the classification model;
in response to determining that the probability exceeds a threshold value, generate a real-time content of interest alert, wherein the real-time content of interest alert comprises a visual component comprising a user interface element for surfacing a meeting application window on a display, and wherein the real-time content of interest alert further comprises at least one of an audible component or a tactile component, wherein at least one of a frequency or an intensity of the at least one of the audible component or the tactile component is dynamically adjusted based on a degree to which the probability exceeds the threshold value; and
in response to user input comprising a selection of the user interface element, surface the meeting application window comprising the meeting along with a label of the theme of interest.

19. The computer-readable storage medium of claim 18, wherein the classification model comprises a Gaussian mixture model, and wherein the computer-executable instructions, when executed by the processor, cause the processor to train the classification model for the theme of interest by generating a Gaussian distribution of the vectors of interest corresponding to the theme.

20. The computer-readable storage medium of claim 18, wherein the computer-executable instructions, when executed by the processor, cause the processor to:
receive an indication that the real-time content of interest alert was a true alert or a false alert; and
in response to receiving an indication that the real-time content of interest alert was a false alert, perform at least one of:
increasing the threshold value for generating the real-time content of interest alert; or
updating the classification model.

* * * * *